US 10,491,075 B2

(12) United States Patent
Eriksen et al.

(10) Patent No.: US 10,491,075 B2
(45) Date of Patent: *Nov. 26, 2019

(54) STATOR ASSEMBLY FOR AN ELECTRIC GENERATOR WITH ACCOMMODATION SPACE

(71) Applicant: Siemens Gamesa Renewable Energy A/S, Brande (DK)

(72) Inventors: Uffe Eriksen, Horsens (DK); Edom Lemma, Vejle (DK); Claus Thygesen, Låsby (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,947

(22) Filed: Mar. 20, 2017

(65) Prior Publication Data

US 2017/0288500 A1  Oct. 5, 2017

Related U.S. Application Data

(60) Provisional application No. 62/315,133, filed on Mar. 30, 2016.

(30) Foreign Application Priority Data

Mar. 30, 2016 (DE) .................. 10 2016 205 248
Mar. 30, 2016 (EP) .................... 16162998

(51) Int. Cl.
H02K 7/18 (2006.01)
H02K 7/102 (2006.01)
(Continued)

(52) U.S. Cl.
CPC ............ *H02K 7/102* (2013.01); *F03D 1/00* (2013.01); *F03D 9/25* (2016.05); *H02K 1/187* (2013.01);
(Continued)

(58) Field of Classification Search
CPC .... F03D 1/00; F03D 9/25; H02K 1/18; H02K 1/187; H02K 7/10; H02K 7/10211;
(Continued)

(56) References Cited

U.S. PATENT DOCUMENTS 4,786,834 A * 11/1988 Grant ................... H02K 9/06
310/168
4,864,176 A * 9/1989 Miller .................. H02K 19/20
310/194
(Continued)

FOREIGN PATENT DOCUMENTS

CN      201887570 U    6/2011
EP      1167754 A2    1/2002
(Continued)

OTHER PUBLICATIONS

EP Examination Report dated Apr. 11, 2018, Application No. 16 162 998.5.
(Continued)

*Primary Examiner* — Tran N Nguyen
(74) *Attorney, Agent, or Firm* — Schmeiser, Olsen & Watts LLP

(57) ABSTRACT

A stator assembly is provided including (a) an inner frame structure having an annular shape with an inner circumferential edge and an outer circumferential edge, wherein the inner frame structure is formed around a center axis corresponding to an axial direction of the electric generator; and (b) an outer frame structure, which surrounds the inner frame structure and which, starting from the outer circumferential edge, includes two inclined annular walls which, along a radial direction, spread apart from each other such that in between a first inclined annular wall and the second inclined annular wall there is formed an accommodation (Continued)

space. Preferably, the inner frame structure and the outer frame structure are made from a single piece.

25 Claims, 6 Drawing Sheets

(51) Int. Cl.
| | |
|---|---|
| *F03D 1/00* | (2006.01) |
| *F03D 9/25* | (2016.01) |
| *H02K 1/18* | (2006.01) |
| *H02K 7/116* | (2006.01) |
| *H02K 9/04* | (2006.01) |
| *H02K 15/00* | (2006.01) |
| *H02K 1/27* | (2006.01) |

(52) U.S. Cl.
CPC .......... *H02K 7/116* (2013.01); *H02K 7/1838* (2013.01); *H02K 9/04* (2013.01); *H02K 15/0006* (2013.01); *H02K 1/2786* (2013.01); *Y02E 10/725* (2013.01)

(58) Field of Classification Search
CPC ........ H02K 7/116; H02K 7/18; H02K 7/1838; H02K 9/04; H02K 9/10; H02K 9/19; H02K 15/00; H02K 15/0006; H02K 5/22
See application file for complete search history.

(56) References Cited

U.S. PATENT DOCUMENTS

| | | | | |
|---|---|---|---|---|
| 7,847,443 | B2* | 12/2010 | Farnia ................... | H02K 1/148 310/209 |
| 2003/0193265 | A1* | 10/2003 | Maslov ................. | H02K 1/187 310/254.1 |
| 2009/0140526 | A1* | 6/2009 | Jansen ..................... | H02K 1/14 290/55 |
| 2009/0243301 | A1* | 10/2009 | Longtin ................... | F03D 7/02 290/55 |
| 2010/0264664 | A1 | 10/2010 | Lauke | |
| 2013/0241365 | A1* | 9/2013 | Booth ................... | H02K 1/187 310/400 |
| 2015/0244221 | A1* | 8/2015 | Canini ................. | H02K 1/148 290/55 |
| 2017/0288500 | A1 | 10/2017 | Eriksen et al. | |

FOREIGN PATENT DOCUMENTS

| | | |
|---|---|---|
| EP | 2351191 A2 | 8/2011 |
| EP | 2351191 B1 | 5/2014 |
| EP | 2767708 B1 | 6/2015 |
| EP | 1167755 B1 | 12/2015 |

OTHER PUBLICATIONS

European Search Report dated Jan. 5, 2017; Application No. 16162998.5; 13 Pgs.
Non-English Chinese Office Action dated Dec. 4, 2018 for Application No. 201710203266.X.

* cited by examiner

STATOR ASSEMBLY FOR AN ELECTRIC GENERATOR WITH ACCOMMODATION SPACE

CROSS-REFERENCES TO RELATED APPLICATIONS

This application claims the priority and benefit of U.S. Provisional Application No. 62/315,133, having a filing date of Mar. 30, 2016, as well as EP Application No. 16162998.5, having a filing date of Mar. 30, 2016, and DE Application No. 102016205248.9, having a filing date of Mar. 30, 2016, the entire contents of all priority documents are incorporated herein by reference.

FIELD OF TECHNOLOGY

The following relates to the technical field of electric generators, in particular electric generators for wind turbines. Specifically, the present invention relates to a stator assembly for an electric generator, which stator assembly comprises an inner frame structure and an outer frame structure. Further, the present invention relates to an electric generator and to a wind turbine which both comprise such a stator assembly.

BACKGROUND

Wind turbines can be erected on-shore or off-shore. Large wind turbines being capable of providing an electric power up to about 6 MW are typically installed off-shore. In particular for maintenance reasons self-excited generators having a rotor assembly with permanent magnets are employed. In the near future wind turbines being capable of providing an electric power in the order of 15 MW will be provided by wind turbine manufactures having a special expertise in the field of off-shore wind turbines. For several technical reasons an electric generator being capable of providing 15 MW of electrical power must have a diameter in the order of 10 m. For efficiency reasons an air gap between (a) the coils of stator segments of the stator assembly and (b) the (permanent) magnets of the rotor assembly should be kept small. Therefore, such a large generator must be built up with an extreme high constructional precision. Further, the large size of such a generator requires special solutions not only for assembling but also for maintaining the generator. A maintenance work may include service tasks such as e.g. an exchange of a magnet on the rotor side and an exchange of a stator segment on the stator side.

The requested extreme high constructional precision requires a mechanically stable support or frame structure both for the rotor assembly and for the stator assembly. On the other side it is desirable to keep the weight (and the cost) of these assemblies within acceptable limits in order to allow for a safe handling when assembling such a large electric generator and when mounting the generator into a nacelle of a wind turbine, in particular into an off-shore wind turbine. In this respect it is further of importance to construct a stator assembly in such a manner that a cooling of components of the stator assembly, in particular of the stator segments, is possible.

EP 2 351 191 B1 discloses a stator assembly for a generator of a wind turbine. The disclosed stator assembly comprises a frame structure which has openings which for cooling purposes allow a stream of air passing through the frame structure.

SUMMARY

An aspect relates to a stator assembly for an electric generator which meets the above mentioned requirements of a high spatial precision, a high mechanical stability, and a comparatively small weight and which allows for an effective cooling of the electric generator for which the provided stator assembly forms a component.

According to a first aspect of the invention there is provided a stator assembly for an electric generator, in particular for a wind turbine. The provided stator assembly comprises (a) an inner frame structure having an annular shape with an inner circumferential edge and an outer circumferential edge, wherein the inner frame structure is formed around a center axis corresponding to an axial direction of the electric generator; and (b) an outer frame structure, which surrounds the inner frame structure and which, starting from the outer circumferential edge, comprises two inclined annular walls which, along a radial direction, spread apart from each other such that in between a first inclined annular wall and the second inclined annular wall there is formed an accommodation space. The inner frame structure and the outer frame structure are made from a single piece.

The described stator assembly is based on the idea that by providing an accommodation space in between the two inclined annular walls of the outer frame structure a mechanically protected region is created which can be used for accommodating functional components of the stator assembly and/or of an electric generator comprising the described stator assembly. The provided accommodation space may be used for instance for accommodating cooling equipment being used for cooling temperature sensitive components of the electric generator. Further, the accommodation space may be used for receiving electric cables for guiding and/or collecting electric currents being generated by stator segments of the stator assembly, which stator segments comprise at least one conductor coil picking up a time alternating magnetic field.

With regard to the mechanical stability of the stator assembly it may be of particular advantage to make both frame structures from a single piece. This may further provide the stator assembly both with a high mechanic stability and with a high spatial precision. Thereby, spatial precision does not only relate to the geometric size, when the stator assembly is produced but also when the electric generator comprising the described stator assembly is in operation. In operation, a rotor assembly of the electric generator rotates around a rotational axis which corresponds to the described center axis.

The term "made as a single piece" may mean that the outer frame structure is fixed to the inner frame structure in a non-detachable manner. This can be realized for instance by attaching the outer frame structure to the inner frame structure by a high precision welding.

At this point it is mentioned that also other attachment principles may be used for mechanically connecting the two frame structures with each other. For instance a permanent bolting by bolts and/or rivets may be used. However, in some cases the two frame structures may be connected with each other in an in principle detachable manner for instance by screws and nuts. In this case the term "made as a single piece" may mean that, although unlockable fastening means or device are used, it is not intended to, after mounting the two frame structures together, separate them from each other at a later time.

In the context of this document "radially" and "radial direction" means perpendicular to the "axial direction" being in line with the "center axis". In a cylindrical coordinate system being used in this document for describing the geometry of the stator assembly the "axial direction" along the center line corresponds to the "height coordinate" and the "radial direction" corresponds the Euclidean distance between the "center axis" and a point of interest. Further, "outer" means radially outer, i.e. a larger Euclidean distance and "inner" means radially inner, i.e. a smaller Euclidean distance.

Due to the described "spreading apart" between the two inclined a annular walls the widths respectively the height along the center of the accommodation space increases with increasing radial distance. Therefore, in radially outer positions larger functional components can be accommodated within the accommodation space than in radially inner positions.

With respect to a symmetry plane being oriented perpendicular to the center axis and being defined by the main extension of the inner frame structure the first inclined annular wall can be located at one side of this symmetry plane whereas the second inclined annular wall can be located at the opposite side of this symmetry plane. With this symmetry plane the two inclined annular walls may form the same angle, when viewing the described stator assembly in a cross sectional plane being defined by the center axis and the radial direction. This angle may be e.g. in the range between 20° and 50°, in particular between 25° and 45°, and more particular between 30° and 40°.

In the three dimensional space the first inclined annular wall and/or the second inclined annular wall may have at least approximately the shape of the curved surface area of a truncated cone.

The inner circumferential edge of the inner frame structure defines an opening which can be used for accommodating a bearing support structure, which can support a rotatable shaft being mechanically connected to a rotor assembly of the electric generator. In order to mount the inner frame structure to such a bearing support structure close to the inner circumferential edge there may be provided appropriate fixation means or device at the inner frame structure. These fixation means or device may be e.g. openings for receiving screws and/or bolts.

According to a further embodiment of the invention the outer frame structure further comprises an annular flange, (i) which, starting from the outer circumferential edge, extends along the axial direction and (ii) which is arranged in between the outer circumferential edge and the second inclined annular wall.

Descriptive speaking, the second inclined annular wall is not directly formed at respectively does not directly contact the outer circumferential edge. In fact the described annular flange is interconnected between the outer circumferential edge and the second inclined annular wall. This means that the described annular flange "shifts" the second inclined annular wall away from the first inclined annular wall. This has the effect that the size respectively the volume of the accommodation space is increased, wherein this increase is directly proportional to the axial extension of the annular shaft. As a consequence, the number and/or the size of functional components of the stator assembly, which functional components can be accommodated within the accommodation space, will be increased respectively enlarged.

Extending "along the axial direction" does not necessarily mean that the annular flange extends solely along the axial direction. However, a solely axial extension may be of advantage because the increase of the accommodation space will be maximized.

At this point it is mentioned that the described annular flange is an optional part of the outer frame structure. Without the described annular flange the two inclined annular walls may represent two sides of a triangle.

According to a further embodiment of the invention within at least one of the two inclined a annular walls there is provided at least one opening allowing a human service technician to enter the accommodation space. This may provide the advantage that a human being which has to perform manual maintenance or repair work at components, which are accommodated within the accommodation space, has an easy access to the accommodation space.

With regard to the number and the size of the provided openings a consideration between two advantageous aspects can be made. Specifically, on the one hand there should be provided a plurality of such openings because it will allow a human service technician to enter the accommodation space at various entrances which may be distributed along a circumference of the respective inclined annular wall. On the other hand mechanical stability aspects should not be lost sight because with an increasing number and/or size of the openings the mechanical stability of the entire stator assembly will deteriorate. The number of openings may be e.g. 2 to 8, preferably 4 to 6. This is presently considered as a suitable compromise between an easy accessibility on the one hand and a sufficient mechanical stability on the other hand.

According to a further embodiment of the invention there is provided at least one further opening within at least one of the two inclined annular walls, wherein the size of the further opening is larger than the size of the opening. This may provide the advantage that not only human beings but also comparatively large components of the described stator assembly, which components are to be installed or replaced, can be transferred through the further opening between an interior and an exterior of the accommodation space.

With regard to the number of further openings the same consideration may apply as for the number of the above described openings. The number of further openings may be e.g. 2 to 8, preferably 4 to 6. This is presently considered as a suitable compromise between an easy access to the accommodation space on the one hand and a sufficient mechanical stability of the stator assembly on the other hand.

Preferably, the openings and the further openings may be arranged along a circumference of the stator assembly in an alternating manner.

The opening(s) and/or of the further opening(s) may have any appropriate shape which allows to use the respective opening for its intended use. Specifically, the opening(s) and/or of the further opening(s) may have a rounded form, e.g. oval or circular. Such an embodiment, wherein the respective (further) opening has no corners or rough edges, may provide the advantage that the mechanical stability loss, which is based on the missing material being associated with the respective (further) opening, will be minimized.

Further, at least some of the opening(s) and/or of the further opening(s) may be provided in both inclined annular walls, such that maintenance work and in particular an exchange of functional components can be accomplished not only from one but from both axial sides of the stator assembly.

According to a further embodiment of the invention the stator assembly further comprises cooling installations, which are accommodated within the accommodation space and which are configured for cooling components of the stator assembly and/or components of a rotor assembly of the electric generator. This may provide the advantage that the accommodation space can be efficiently used for receiving functional components of the stator assembly, wherein the walls respectively the flange effectively protect the cooling installations from negative external influences.

Preferably, several cooling installations may be arranged along the circumferential direction within the accommodation space such that a well distributed or at least approximately uniform cooling functionality can be provided. The number of cooling installation may be for instance in a range from 6 to 18 and preferably from 10 to 14.

With regard to the spatial dimension of the above described opening and further opening it is mentioned that the further opening may be large enough in order to insert into the accommodation space and/or to remove from the accommodation space a cooling installation or at least larger component parts of the cooling installation. In practice it has turned out that in particular ventilation devices and more in particular electric motors of ventilation devices have to be exchanged in order to guarantee a reliable cooling of the electric generator.

By contrast to the size of the (at least one) further opening the (at least one) opening may be significantly smaller such that larger component parts of the cooling installation do not fit through the opening. However, the (at least one) opening may be large enough in order to allow a human service technician to enter and to leave the accommodation space.

In a currently preferred embodiment along a circular circumference around the center axis a plurality of openings and a plurality of further openings are arranged in an alternating manner with a sequence (i) opening, (ii) further opening, (iii) opening, (iv) further opening and so on.

According to a further embodiment of the invention the cooling installation comprises at least one ventilation device configured for driving a stream of a gaseous heat transfer medium through at least a part of the electric generator.

The described at least one ventilation device may be realized by at least one cooling fan, which provides sufficient ventilation force for driving the gaseous heat transfer medium to those portions of the electric generator, which portions need to be cooled. Preferably, the gaseous heat transfer medium is air.

According to a further embodiment of the invention the cooling installations further comprises at least one heat exchanger configured for transferring heat between the gaseous heat transfer medium and a liquid heat transfer medium.

Descriptive speaking, the described heat exchanger provides a gas-liquid interface for a heat transfer from the interior of the electric generator to the exterior of the electric generator. Apart from taking benefit from well-known advantages of a liquid cooling system (e.g. a high cooling efficiency) the described heat exchanger may allow for spatially separating the interior of the electric generator from the exterior of the electric generator. This may provide the advantage that the interior of the electric generator can be kept separated from the exterior of the electric generator such that an unwanted infiltration of dirt and/or salty air into (sensitive regions of) the electric generator can be effectively prevented.

In case the described stator assembly is used for an electric generator of a wind turbine pipes guiding the liquid heat transfer medium, e.g. water, may run into the interior of the nacelle of the wind turbine. Heat being transported away from the electric generator by the liquid heat transfer medium may be delivered to the surrounding of the nacelle. Thereby, a further heat exchanger, in particular a passive heat exchanger without a fan, may be installed preferably at the top of the nacelle such that the passive heat exchanger is located within the wind driving also the wind rotor of the wind turbine.

Preferably, each cooling installation comprises the same number, preferably one, of ventilation devices and heat exchangers.

According to a further embodiment of the invention within at least one of the two inclined annular walls there is provided at least one aperture allowing a driven heat transfer medium, in particular the above mentioned gaseous heat transfer medium driven by the ventilation device, to flow between the inside of the accommodation space and the outside of the accommodation space. This may provide the advantage that a transfer of liquid and/or gaseous heat transfer medium to and/or from the accommodation space is possible.

In this respect it is mentioned that typically the outside of the accommodation space is inside of a housing of the generator wherein several components of the generator, in particular stator segments with coil windings, need to be cooled in order to guarantee a reliable operation of the electric generator.

The aperture may have any appropriate size, which allows for guiding the (gaseous) heat transfer medium through the respective inclined annular wall. Depending on the specific application it might make sense to realize the at least one aperture with a shape differing from a circular or an oval form. Preferably, a rectangular form may be used for the at least one aperture.

According to a further embodiment of the invention both the first inclined annular wall and the second inclined annular wall are provided with at least one aperture and/or with at least one opening and/or with the at least one further opening.

With regard to the at least one opening and the at least one further opening this may provide the advantage that there is provided access to the accommodation space from two axial sides.

With regard to the at least one aperture this may allow for (gaseous) heat transfer media to enter or to leave the accommodation space from both sides. As a consequence a large freedom of design is provided for realizing a proper stream of heat transfer medium though all necessary (hot) regions of the electric generator. In order to allow for an at least approximately constant cooling power within different regions of the electric generator a plurality of apertures may be arranged in a circumferential manner along the accommodation space.

Preferably, with regard to a circular circumference around the center axis every second aperture being formed within the outer frame structure (i.e. one of the "uneven numbered" apertures) is formed within the first inclined annular wall and, in an interleaving manner, every other second aperture being formed within the outer frame structure (i.e. one of the "even numbered" apertures) is formed within the second inclined annular wall. This may provide the advantage that a more or less symmetric flow of (gaseous) heat transfer medium though the housing of the electric generator can be realized.

According to a further embodiment of the invention the stator assembly further comprises a plurality of stator segments, each comprising at least one conductor coil in which during normal operation of the electric generator magnetic induction takes place. Thereby, the stator segments are mounted at the outer circumference of the outer frame structure in between a first radial outer edge of the first inclined annular wall and a second radial outer edge of the second inclined annular wall.

This means that the described stator assembly may form the stationary part of an electric generator having a so-called inner stator-outer rotor configuration. In other words, a rotor assembly a part of which is located radially outwards from the stator segments rotates around the stator assembly. Thereby, in operation, magnets, in particular permanent magnets, which are arranged at an inner surface of an outer rotor assembly ring cause a time varying magnetic flux at the location of the stator segments. In between the magnets and the stator segments there is provided an air gap, which according to embodiments of the invention may have a dimension of at least approximately 10 mm.

In order to achieve a high efficiency of the electric generator the number of stator segments being mounted at the outer frame structure may be such that the entire circumference of the stator assembly is covered with stator segments. In this respect it is mentioned that the stator segments may also serve as a cover for the accommodation space, which in the radial outer direction closes the accommodation space such that functional components being accommodated within the accommodation space are protected in a reliable and efficient manner.

According to a further embodiment of the invention the stator assembly further comprises at least one service platform, which is attached to the inner frame structure and which extends in the axial direction.

The service platform may be used as a footprint area for a human service technician in order to facilitate maintenance work. The service platform may preferably have a flat or even upper surface onto which the service technician can place his feet in a convenient manner. With respect to the angular orientation of the stator assembly, which is given at the latest when the electric generator is put in operation, the described service platform is oriented in such a manner that the upper surface is oriented horizontally.

It is mentioned that in many wind turbine applications the center axis respectively the rotational axis of the electric generator (and of the wind rotor of the wind turbine) is not oriented horizontally but at a small angle of e.g. 7° with respect to the horizontal plane. In this case also the extension of the service platform may form a corresponding small angle with respect to the axial direction respectively with respect to the center axis in order to "make the service platform horizontal".

With regard to the number of service platforms there is no principal limitation. However, according to preferred embodiments of the invention there are provided two service platforms which are located at the same height level. This height level may be defined by the above defined center axis.

According to a further embodiment of the invention the stator assembly further comprises at least one first mechanical interface, which is formed at the inner frame structure and which is configured (i) for receiving a turning device which itself is configured for engaging with a rotor assembly of the electric generator and (ii) for turning the rotor assembly.

The described turning device can be used to move the rotor assembly in a controlled manner such that it will be brought into a predetermined angular position. At the predetermined angular position the movement of the rotor assembly will be stopped by stopping the operation of the turning device. This can be achieved simply by stopping the operation of the actuator. Additionally, a brake system and/or a mechanical blocking system may be used in order to maintain a proper angular position of the rotor assembly. In this respect it should be clear that the described control movement by the turning device does not take place during a normal operation of the electric generator. The described turning device will merely become active in case of e.g. a maintenance procedure, wherein components of the electric generator, in particular stator segments, are repaired or exchanged.

The turning device may comprise an actuator and an engagement element being drivable by the actuator. The engagement element must be arranged and configured in order to engage with an engagement structure of the rotor assembly. Further, the turning device may be configured for adopting two operational states: An active operational state and a passive operational state. In the active operational state there is an engagement between the engagement element and the engagement structure. In the passive operational state the engagement element and the engagement structure are mechanically decoupled from each other. Descriptive speaking, with the provision of the two operational states there may be established an engagement "on demand" between the engagement element of the turning device and the engagement structure of the stator assembly by bringing temporarily the turning device into its active operational state.

Preferably there are provided several first mechanical interfaces such that several turning devices can be used for rotating the rotor assembly in a controlled manner. In this context it might be of advantage if the first mechanical interfaces are circumferentially distributed around the rotational axis. This may allow for a circumferentially at least approximately uniform force transmission into the rotor assembly, which of course also has an impact on mechanical deformations of the stator assembly. For this reason a more or less circumferentially uniform force transmission may provide an important contribution that the entire electric generator will exhibit an excellent spatial precision not only during normal operation but also during a maintenance procedure (even when the turning devices are in the active operational state).

With respect to the number of first mechanical interfaces there is no principal limitation. Because of efficiency and constructional reasons presently a number of 7 to 15, preferably 9 to 13 first mechanical interfaces seems to be appropriate.

According to a further embodiment of the invention the first mechanical interface is configured for receiving the turning device in a detachable manner. This may provide the advantage that the turning device(s) may only be temporarily mounted to the stator assembly in case there is maintenance work to do with the electric generator. During normal operation of the electric generator the turning device(s) may be used for maintenance work for other electric generators.

At this point it is mentioned that some first mechanical interfaces may be used for permanently accommodating a turning device wherein other first mechanical interfaces may be used for temporarily accommodating a turning device. Temporarily installing also the non-permanent turning devices may make sense if the stator assembly is mechanically coupled with an unbalanced wind rotor because this requires a large moment of force which may not be provided for by the permanently installed turning devices.

In this document "balanced" may particularly mean that the center of gravity of all rotor blades being installed at the hub of the wind rotor coincides at least approximately with the rotational axis. An "unbalanced" state is given in particular if during an assembly of the wind rotor not all rotor blades are installed yet. Such an assembly procedure is not only necessary when building up the wind rotor for the first time but also when rotor blades have to be exchanged.

According to a further embodiment of the invention the stator assembly further comprises at least one second mechanical interface, which is formed at the inner frame structure and which is configured (i) for receiving a brake caliper which is configured for engaging with a brake disk of the rotor assembly of the electric generator and (ii) for stopping a rotational movement of the rotor assembly.

The brake caliper being mounted to the stator assembly may engage with a corresponding brake disc being mounted to the rotor assembly. The brake caliper together with the brake disk form a brake system, which may be used in particular for reducing or decelerating a rotational movement of the rotor assembly and/or for keeping a non-rotating rotor assembly at its angular position. Specifically, the brake system or the entirety of all brake systems may not be strong enough in order to be used as an emergency brake for stopping the operation of an entire wind turbine abruptly.

With regard to the radial position of the brake system it may be of advantage if the brake system is located at a radially inner portion of the inner frame structure. This may provide the advantage that brake dust will be generated radially more inwards and, in case of a preferred inner stator-outer rotor configuration, "far" away from stator segments being located at the outer edge of the stator assembly. As a consequence the comparatively sensitive electric coil windings of the stator segments will not be exposed to harmful brake dust.

In this respect it is pointed out that a radial inner position of the brake disk may also cause a disadvantage: Due to leverage principles the moment of force, which could be handled by the described brake system, is relatively small. Therefore, according to a currently preferred design the brake system can only be used as a so called service brake which must only be put in operation when the rotor assembly respectively the wind rotor is running at very low speed. Starting from high speeds (in normal operation of a wind turbine) low speeds could be reached by known blade pitching procedures.

With regard to the number and the spatial distribution of second mechanical interfaces being formed at the inner frame structure the same physical principles with regard to moment of forces apply as described above with respect to the (permanently and non-permanently installed) turning devices. Because of efficiency and constructional reasons presently a number of 7 to 15, preferably 9 to 13 further brake systems seems to be appropriate.

According to a further embodiment of the invention the at least one second mechanical interface is configured for receiving the brake caliper in a radially shiftable manner, wherein (i) in a first radial position of the brake caliper a braking interaction between the brake caliper and the brake disk is possible and (ii) in a second radial position of the brake caliper a braking interaction between the brake caliper and the brake disk is not possible. Descriptive speaking, in the second radial position the brake caliper has been radially shifted out from the brake disk.

The brake caliper may be set into the second position if the electric generator is in a usual operation mode, i.e. a wind turbine comprising the generator produces electric power. Any unwanted mechanical interaction between the brake caliper and the brake disk which would slow down the rotational speed of the rotor assembly will be effectively prevented. In other words, the brake caliper may be set into the first position only when a braking effect may be needed.

In this respect it is mentioned that in the second radial position the caliper may not be completely removed from the brake disk. This means that there is only a partial spatial overlap between the brake disk a brake pad of the caliper such that when (unintentionally) activating the caliper there would establish a reduced braking interaction or braking force. Preferably, the second radial position is offset from the first radial position to such a extent that an exchange of a brake pad is possible.

According to a further embodiment of the invention the second mechanical interface comprises a guidance structure having a radial extension and the brake caliper comprises a guidance element which engages with the guidance structure. This may provide the advantage that shifting the brake caliper between the first radial position and the second radial position can be accomplished in an easy and effective manner.

In a very simple configuration the guidance structure may be realized by a slot formed within the inner frame structure of the stator assembly. The guidance element may simply be a pin or bolt running within the slot. In other configurations the guidance structure may be realized by a rail or any other structure allowing for guiding the guidance element.

According to a further embodiment of the invention the stator assembly further comprises a fixation system for detachably fixing the brake caliper either in the first radial position or in the second radial position. The fixation system comprises (i) first fixation means or device being associated with a fixation of the brake caliper in the first radial position and (ii) second fixation means or device being associated with a fixation of the brake caliper in the second radial position. This may provide the advantage that depending on the operational state of the electric generator the brake caliper may be fixed in its proper run via position.

The first fixation means or device may allow for a mechanically stronger fixation of the brake caliper to the inner frame structure of the stator assembly than the second fixation means. This may provide the advantage that the fixation system can be designed respectively dimensioned in an effective manner wherein the fixation strength, which can be provided, is only as strong as necessary. Descriptively speaking, the fixation system may not be over-dimensioned which allows to realize the fixation system in reasonable prized manner.

According to a further embodiment of the invention the first fixation means or device comprises a plurality of axially shiftable bolts, which are arranged in a one- or two-dimensional array. In addition or alternatively the second fixation means or device comprises a clamping device. This may provide the advantage that only in the first radial position there will be provided an extreme strong torsional strength which prevents the brake caliper from getting twisted around an axis being parallel to the center axis. In the second radial position such a strong torsional strength is not needed because here the brake system cannot come in operation.

The above mentioned guidance element may be realized by a (small) subset of the plurality of bolts. Thereby, by contrast to the other (axially shiftable) bolts the (small) subset of e.g. only two bolts may be spatially fixed bolts which are configured for running within and/or along the above mentioned guidance element.

According to a further embodiment of the invention the stator assembly further comprises at least one third mechanical interface, which is formed at the inner frame structure and which is configured for receiving at least a part of a rotor lock system which (i) in a first axial position interlocks a rotational movement of the rotor assembly of the electric generator with respect to the stator assembly and (ii) in a second axial position enables a rotational movement of the rotor assembly with respect to the stator assembly.

The described rotor lock system may be used in particular if the rotor assembly should be fixed at an angular position at which there is a strong imbalance of the rotor assembly respectively of a wind rotor being rotatory coupled with the rotor assembly. Such an imbalance may occur in particular during a mounting or demounting procedure of a rotor blade to or from the hub of the wind rotor.

A pneumatic actuator may be used for shifting the piston. Preferably, for each piston a separate (pneumatic) actuator is provided.

Providing a comparatively large number of axially shiftable pistons, e.g. more than 12, may provide the advantage that the corresponding blocking force will be distributed along the circumferential direction. This yields smaller deformations of both the stator assembly and the rotor assembly.

In this respect it is mentioned that according to a currently preferred embodiment of the invention an angular distribution of the first mechanical interfaces, the second mechanical interfaces, and/or the third mechanical interfaces may be asymmetric with respect to a circumference around the center axis. This may particularly mean that the distance between at least some neighboring mechanical interfaces along the described circumference is not always the same.

Providing a non-uniform angular distribution of at least some of the mechanical interfaces may provide the advantage that certain angular positions may not be occupied by any one of the components turning devices, brake calipers and/or rotor lock system. A "non-occupied" angular range may include a plurality of angular positions wherein the presence of any one of such components turning device might spatially restrict the presence of other components.

It is further mentioned that an angular range, which is located below the center axis, is free from first mechanical interface(s), second mechanical interface(s), and/or third mechanical interface(s). This may provide the advantage that below a shaft of the rotor assembly or of the stator assembly there will be no one of the components turning devices, brake calipers and/or rotor lock system, which component, because of its angular position, would not be reachable by a crane having a rope, which crane can only reach the respective component from above (i.e. along a vertical direction parallel to the direction of gravity).

According to a further aspect of the invention there is provided an electric generator, in particular an electric generator for a wind turbine. The provided electric generator comprises (a) a stator assembly as described above; and (b) a rotor assembly rotatably supported at the stator assembly for rotating around the center axis. The electric generator may have in particular an inner stator—outer rotor configuration.

The described electric generator is based on the idea that the above elucidated stator assembly provides a very high mechanical stiffness and stability, which is in particular important for wind turbines and even more important for wind turbines being erected off-shore, where the maintenance of the electric generator naturally requires additional effort as compared to wind turbines being erected on-shore.

It should be clear that in the described inner stator-outer rotor configuration stator segments comprising conductor coils, in which during normal operation of the generator magnetic induction takes place, are mounted at the outer circumference of the stator assembly. Further, magnets of the rotor assembly produce, during normal operation, a time varying magnetic field at the stator segments. Thereby, the magnets may be in particular permanent magnets, which are arranged at the inner side of an outer wall of the rotor assembly. For attaching the magnets axially oriented slots may be provided at this inner side, wherein the magnets can be axially inserted into these slots. Furthermore, in between the stator segments and the (permanent) magnet there is provided an air gap. The mechanical stability of both the stator assembly and the rotor assembly must be high enough in order to ensure that a mechanical contact between the stator segments and the (permanent) magnets is excluded for any time.

It is mentioned that around the center axis a radially inner space of the stator assembly is not be free because it is occupied by a main bearing of the electric generator.

According to an embodiment of the invention the outer frame structure has an outer diameter larger than 7 m, in particular larger than 8 m, and more particular larger than 9 m. In addition or alternatively an air gap between the stator segments of the stator assembly and the magnets of the rotor assembly is smaller than 25 mm, in particular smaller than 20 mm and more particular smaller than 15 mm.

As can be taken from the description given above such a large diameter and even larger diameters of e.g. 10 m are only possible because of the stable mechanical configuration of the stator assembly. The same holds for the size of the small air gap which according to preferred embodiments has a size of at least approximately 10 mm. It should be clear that in view of the large size of the generator this small air gap requires a very high geometric precision and mechanical stability of both the stator assembly, the rotor assembly, and a bearing system between the stator assembly and the rotor assembly. Therefore, smoothly acting turning device(s), brake system(s) and piston(s) of the rotor lock system may be essential in order to guarantee are high degree of serviceability respectively an easy maintenance of the described generator.

The radially outer dimension of the outer frame structure of the stator assembly or alternatively the radially outer side of the rotor assembly may define the geometric dimension of the generator along a direction perpendicular to the center axis respectively the rotational axis.

According to a further aspect of the invention there is provided a wind turbine for generating electrical power, in particular an off-shore wind turbine. The provided wind turbine comprises (a) a tower; (b) a wind rotor, which is arranged at a top portion of the tower and which comprises at least one blade; and (c) an electric generator as described above, wherein the electric generator is mechanically coupled with the wind rotor.

It has to be noted that embodiments of the invention have been described with reference to different subject matters. However, a person skilled in the art will gather from the above and the following description that, unless other notified, in addition to any combination of features belonging to one type of subject matter also any combination between features relating to different subject matters is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
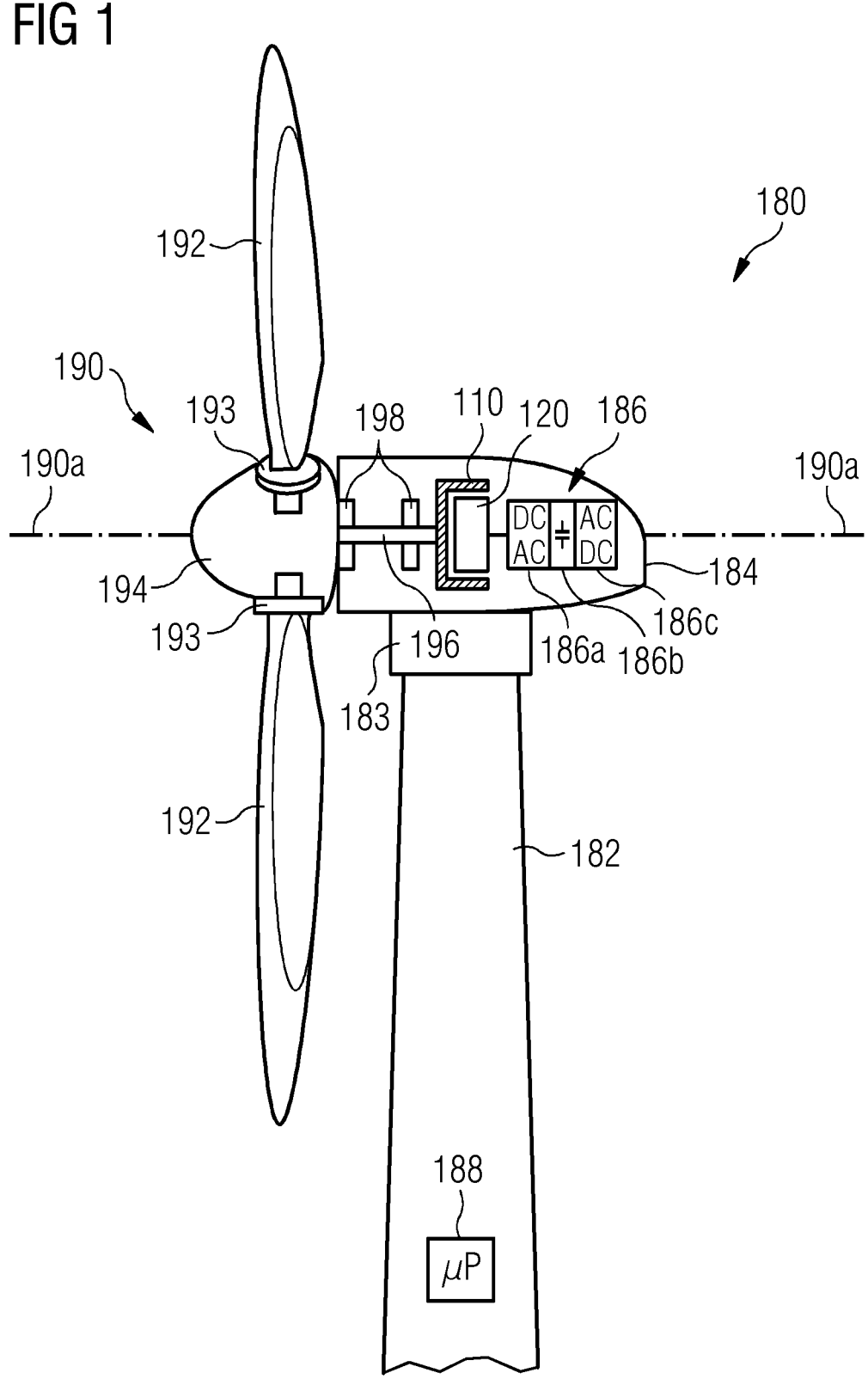
FIG. 1 shows a wind turbine comprising an electric generator in accordance with an embodiment of the invention.

The illustration in the drawing is schematic. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Further, spatially relative terms, such as "front" and "back", "above" and "below", "left" and "right", et cetera are used to describe an element's relationship to another element(s) as illustrated in the figures. Thus, the spatially relative terms may apply to orientations in use which differ from the orientation depicted in the figures. Obviously all such spatially relative terms refer to the orientation shown in the figures only for ease of description and are not necessarily limiting as an apparatus according to an embodiment of the invention can assume orientations different than those illustrated in the figures when in use.

FIG. 1 shows a wind turbine 180 according to an embodiment of the invention. The wind turbine 180 comprises a tower 182, which is mounted on a non-depicted fundament. On top of the tower 182 there is arranged a nacelle 184. In between the tower 182 and the nacelle 184 there is provided a yaw angle adjustment device 183, which is capable of rotating the nacelle 184 around a not depicted vertical axis, which is aligned with the longitudinal extension of the tower 182. By controlling the yaw angle adjustment device 183 in an appropriate manner it can be made sure, that during a normal operation of the wind turbine 180 the nacelle 184 is always properly aligned with the current wind direction.

The wind turbine 180 further comprises a wind rotor 190 having three blades 192. In the perspective of FIG. 1 only two blades 192 are visible. The wind rotor 190 is rotatable around a rotational axis 190a. The blades 192, which are mounted at a hub 194, extend radially with respect to the rotational axis 190a.

In between the hub 194 and a blade 192 there is respectively provided a blade adjustment device 193 in order to adjust the blade pitch angle of each blade 192 by rotating the respective blade 192 around a not depicted axis being aligned substantially parallel with the longitudinal extension of the blade 192. By controlling the blade adjustment device 193 the blade pitch angle of the respective blade 192 can be adjusted in such a manner that at least when the wind is not so strong a maximum wind power can be retrieved from the available wind power. However, the blade pitch angle can also be intentionally adjusted to a position, in which only a reduced wind power can be captured.

Within the nacelle 184 there is provided an electric generator 100. In accordance with basic principles of electrical engineering the electric generator 100 comprises a stator assembly 110 and a rotor assembly 120. According to the embodiment described hear the electric generator 100 in realized with a so called inner stator—outer rotor configuration. Permanent magnets being attached to the rotor assembly 120 travel around stator segments being attached at the stator assembly 110. In between the stator segments, which comprise coils for picking up a time alternating magnetic induction, and the permanent magnets, there is formed an air gap. According to the exemplary embodiment described here the stator assembly 110 has an outer diameter in the order of 10 m and the air gap has a size of 10 mm. From these dimensions one can recognize that there are extreme high demands regarding the mechanical precision and stability for both the stator assembly 110 and the rotor assembly 120.

The wind rotor 190 is rotationally coupled with the rotor assembly 110 by a rotatable shaft. A schematically depicted bearing assembly 198 is provided in order to hold in place both the wind rotor 190 and the rotor assembly 120. As can be seen from FIG. 1 the shaft 196 extends along the rotational axis 190a. The rotational axis 190a is identical with a center axis of the stator assembly 110.

It is mentioned that the wind turbine 180 is a so called direct drive wind turbine wherein between wind rotor 190 and rotor assembly 110 the is not provided a gear box. However, it is mentioned that the electric generator 100 could also be driven indirectly via a gear box, which may be used to convert the number of revolutions of the wind rotor 190 typically into a higher number of revolutions of the rotor assembly 120.

In order to provide an AC power signal being matched with a utility grid the electric output of the stator assembly 110 is electrically connected to a power converter 186. The power converter 186 comprises a generator side AC-DC converter 186a, an intermediate DC bridge 186b, and a grid side DC-AC converter 186c. The AC-DC converter 186a and the DC-AC converter 196c comprise several not depicted high power semiconductor switches which, in a known manner, are arranged in a bridge configuration for each phase of an AC current provided by the electric generator 100.

The wind turbine 180 further comprises a control system 188 for operating the wind turbine 100 in a highly efficient manner. Apart from controlling for instance the yaw angle adjustment device 183 the depicted control system 188 is also used for adjusting the blade pitch angle of the blades 192 of the wind rotor 190 in an optimized manner.

Figure 2:
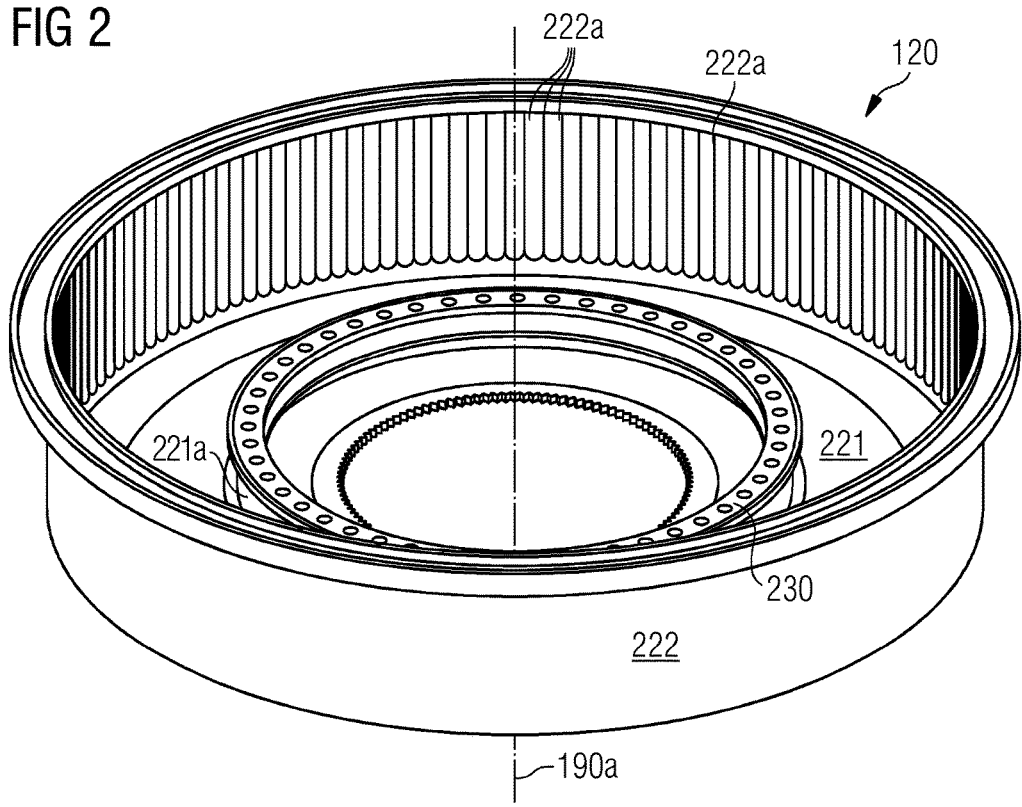
FIG. 2 shows the rotor assembly of the electric generator.

FIG. 2 shows in more detail the rotor assembly 120 of the electric generator 100. The rotor assembly 120 comprises a annular base plate 221. The inner large opening of the base plate 221 serves to accommodate respectively to connect the rotor assembly 120 with the main bearing 196, which is schematically indicated in FIG. 1. At the outer edge of the base plate 221 there is attached a circumferential ring 222. At the inner side of the circumferential ring 222 there are formed slots 222a into which not depicted permanent magnets can be inserted. In operation, these magnets provide the time alternating magnet flux which is picked up by the coils of the stator segments of a stator assembly in order to generate AC current.

Approximately at a radial middle portion of the annular base plate 221 there is erected a circular flange 221a. The circular flange 221a extends from the base plate 221 along an axial direction which is parallel to the rotational axis 190a depicted also in FIG. 1. On top of the flange there is mounted an annular device 230. As will be described below in detail, off time normal operation this annular device 230 is used both (a) for interacting with turning device which can rotate the rotor assembly 120 in a controlled manner e.g. for maintenance procedures and (b) for interacting with brake calipers which can slow down a rotational movement of the rotor assembly 120 in a controlled manner.

Figure 3:
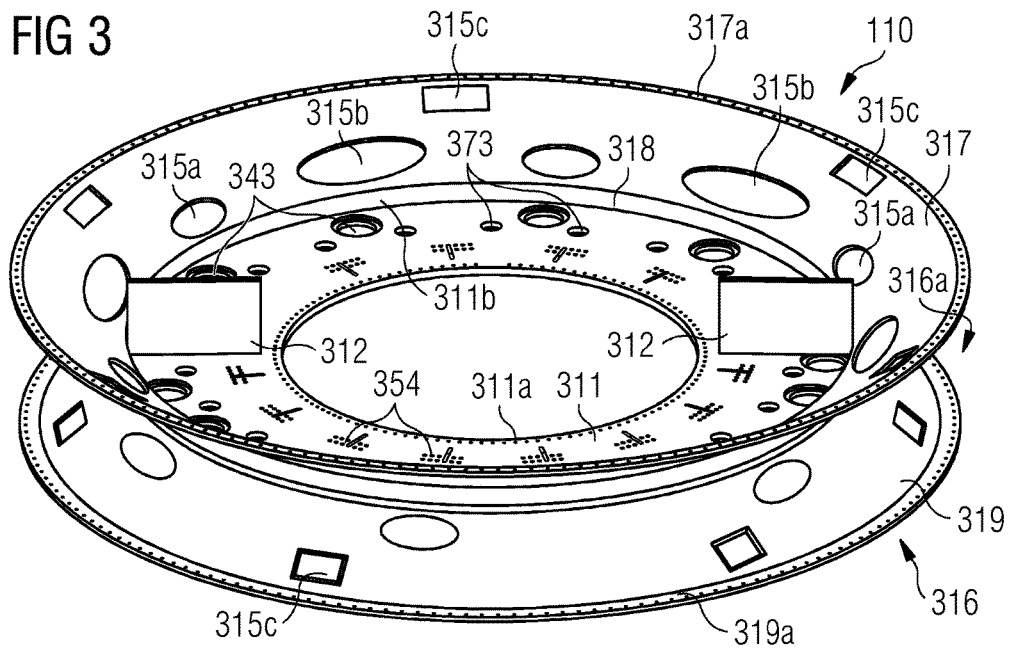
FIG. 3 shows the frame construction of the stator assembly of the electric generator.

FIG. 3 shows in more detail the stator assembly 110 of the electric generator 100. The stator assembly 110 comprises a radially inner frame structure 311 and a radially outer frame structure 316. The inner frame structure 311 comprises an inner circumferential edge 311a and an outer inner circumferential edge 311b. The opening being defined by the inner circumferential edge 311a is used for receiving a not depicted bearing support structure, which comprises a bearing supporting the shaft 196 schematically depicted in FIG. 1.

Along the radial direction the outer frame structure 316 forks apart into two slanted portions, a first inclined annular wall 317 and a second inclined annular wall 319. The two inclined annular walls 317 and 319 define a wedged shaped accommodation space 316a being used for accommodating functional components of the stator assembly such as e.g. cooling installations.

In order to increase the volume of the accommodation space 316a and in particular in order to strengthen the mechanical stricture of the stator assembly 110 there is provided an annular flange 318. The annular flange 318 extends in an axial direction (parallel to the center axis 190a) in between the outer circumferential edge 311b and the first inclined annular wall 317.

In FIG. 3, a first radial outer edge of the first inclined annular wall 317 is denominated with reference numeral 317a. Accordingly, a second radial outer edge of the second inclined annular wall 319 is denominated with reference numeral 319a. At these two radial outer edges 317a, 319a there are mounted stator segments, which are not depicted in FIG. 3. The stator segments comprise conductor coils (also not depicted in FIG. 3), in which during normal operation of the generator magnetic induction takes place.

As can be seen from FIG. 3, at the inner frame structure 311 there are mounted two plates 312. These plates serve as platforms 312 onto which human worker can stand in order to carry out assembly and/or maintenance work.

As can be further seen from FIG. 3, within the outer frame structure 316 and specifically within the two inclined annular walls 317 and 319 there are provided several recesses. These recesses include several openings 315a, several further openings 315b, and several apertures 315c. According to the exemplary embodiment described here the openings 315a are intended as an entrance for a human service technician to enter the accommodation space 316a. The further openings 315b, which have a larger size than the openings 315a, serve as a gate for bringing comparatively large components, in particular the above mentioned cooling installations, into the accommodation space 316a and, if necessary, to remove such large components out from the accommodation space 316a. The apertures 316c are used for transferring gaseous and/or liquid heat transfer media into the accommodation space 316a and/or out from the accommodation space 316a.

As can be furthermore seen from FIG. 3, at and within the inner frame structure 311 there are provided several mechanical interfaces, first mechanical interfaces 343, second mechanical interfaces 354, and third mechanical interfaces 373. Since the three types of interfaces are used for different purposes, they may have different spatial designs.

Specifically, the first mechanical interfaces 343 are used for accommodating respectively one not depicted turning device which itself is configured for engaging with the rotor assembly 120 of the electric generator 100 and which can be activated in order to rotate respectively turn the rotor assembly 120 in a controlled manner. The second mechanical interfaces 354 are used for attaching respectively one not depicted brake caliper, which is configured for engaging with a brake disk of the rotor assembly 120. By an activation of the brake caliper a rotational movement of the rotor assembly 120 may be decelerated or stopped. The third mechanical interfaces 373 are used for attaching at least a part of an also not depicted rotor lock system which (i) in a first axial position interlocks a rotational movement of the rotor assembly 120 with respect to the stator assembly 110 and (ii) in a second axial position enables a rotational movement of the rotor assembly 120 with respect to the stator assembly 110.

Further details regarding the turning devices, the brake calipers and its specifically shaped second mechanical interfaces, and the rotor lock system will be presented below.

It is mentioned that due to the above mentioned extreme high demands regarding the mechanical precision and stability of the stator assembly 110, the inner frame structure 311 as well as the outer frame structure 316 with its inclined annular walls 317, 319 are realized by a large single piece component wherein several high precision welding connections are used in order to meet the high mechanical demands.

Figure 4:
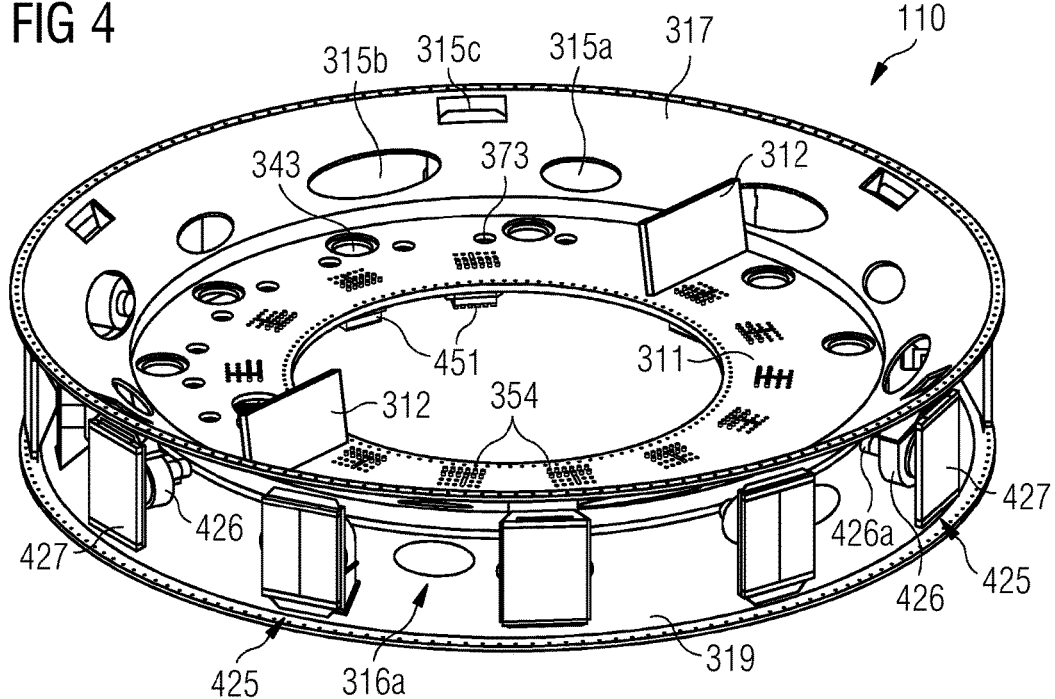
FIG. 4 shows the stator assembly with a plurality of cooling installations.

FIG. 4 shows the stator assembly 110 together with its cooling installations 425 being arranged along a circular line within the accommodation space 316a. According to the exemplary embodiment described here there is provided a plurality of cooling installations 425, wherein each one comprises a heat exchanger 427 and a ventilation device 426. Each ventilation device 426 is driven by an electric motor 426a. The heat exchanger 427 and a ventilation device 426 together form a gas—liquid interface for a heat transfer from the interior of the electric generator 100 to the exterior of the electric generator 100.

According to the exemplary embodiment described here air as the gaseous heat transfer medium is radially collected from not depicted stator segments surrounding the annular accommodation space 316a and is exhausted axially (via the apertures 315c) from the accommodation space 316a, driven by the ventilation device 426, into cooling path portions arranged within the housing of the generator. Proper air guiding elements may direct the driven air into an airgap extending between the stator segments and permanent magnets. Not depicted cooling slots formed within the stator segments close the cooling path for the gaseous heat transfer medium air.

In FIG. 4 there are further depicted, although obscured partially by the inner frame structure 311, brake calipers 451. As will be described below in more detail, the brake calipers 451 can engage with a brake disk mounted to the rotor assembly. Upon activation of the brake calipers 451 the rotational movement of the rotor assembly will be decelerated.

Figure 5:
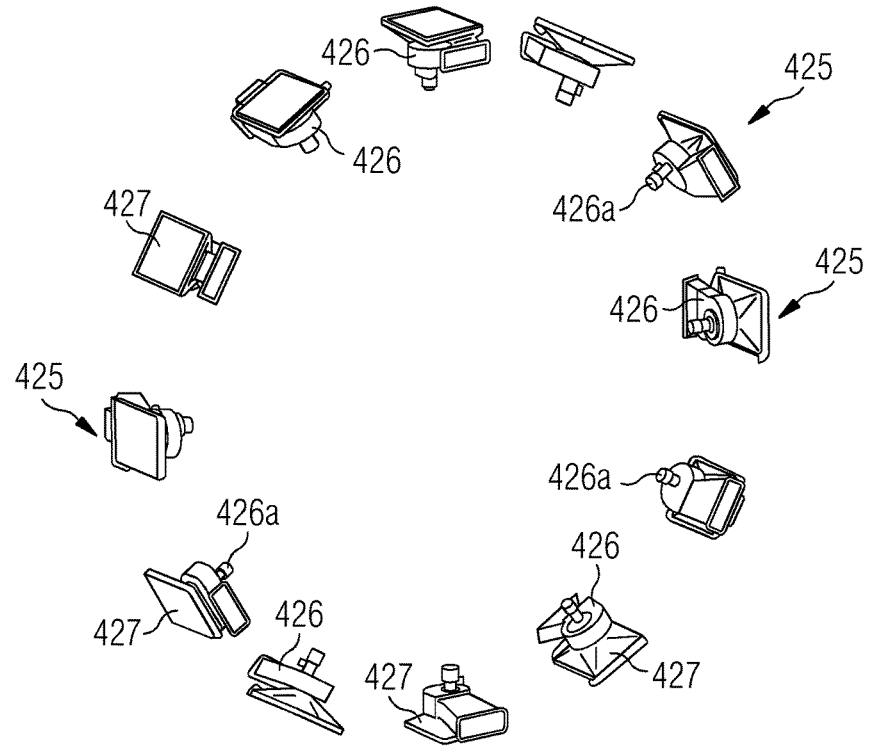
FIG. 5 shows an illustration of solely the plurality of cooling installations.

FIG. 5 shows an illustration of solely the plurality of cooling installations. According to the exemplary embodiment described here along a circumferential circular line every second cooling installation 425 is placed respectively orientated in such a manner as to allow a flow of heat transfer medium through the stator frame structure. Thereby, the squared apertures are employed in order to allow the heat transfer medium to pass the respective inclined annular wall 317 or 319. As can be seen from FIG. 5, according to the exemplary embodiment described here, there are provided altogether twelve cooling installations 425. Of course, in other designs the number of cooling installations may be different.

Figure 6:
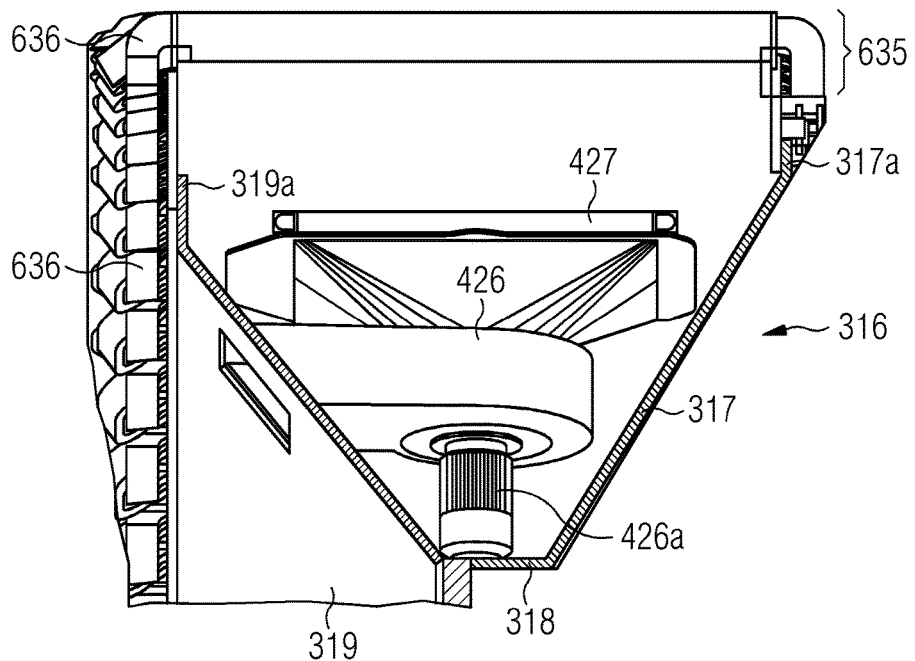
FIG. 6 shows a cross section of an accommodation space formed by an outer frame structure of the stator assembly.

FIG. 6 shows a cross section of the accommodation space 316a formed by the outer frame structure 316 of the stator assembly 110. A stator segment 635 comprising several coil windings 636 is arranged at the first radial outer edge 317a of the first inclined annular wall 317 and at the second radial outer edge 319a of the second inclined annular wall 319. It can be seen that according to the embodiment described here that the cooling installation each comprising the heat exchanger 427, the ventilation device 426, and the electric motor 426a driving a non-depicted fan of the ventilation device 426 are spatially designed in such a manner that they occupy the accommodation space 316a of the outer frame structure 316 in a spatially effective manner. From this spatially effective utilization of the accommodation space 316a it should be clear that according to the embodiment described here it makes sense to provide the outer frame structure 316 with a plurality of openings 315a and further openings 315b in order to allow a service technician to enter the accommodation space 316a at different positions along the circumference of the accommodation space 316a.

Compared to the illustration in FIG. 3 the outer frame structure 316 with its two inclined annular walls 317, 319 are depicted in more detail. In order to enlarge the accommodation space 316a in between the two inclined annular walls 317, 319 the inclined annular wall 317 is not formed directly at the (outer circumferential edge 311b of) inner frame structure 311 but at the axial flange 318 which is formed in between the outer edge of the inner frame structure 311 and the inner edge of the inclined annular wall 317.

Figure 7:
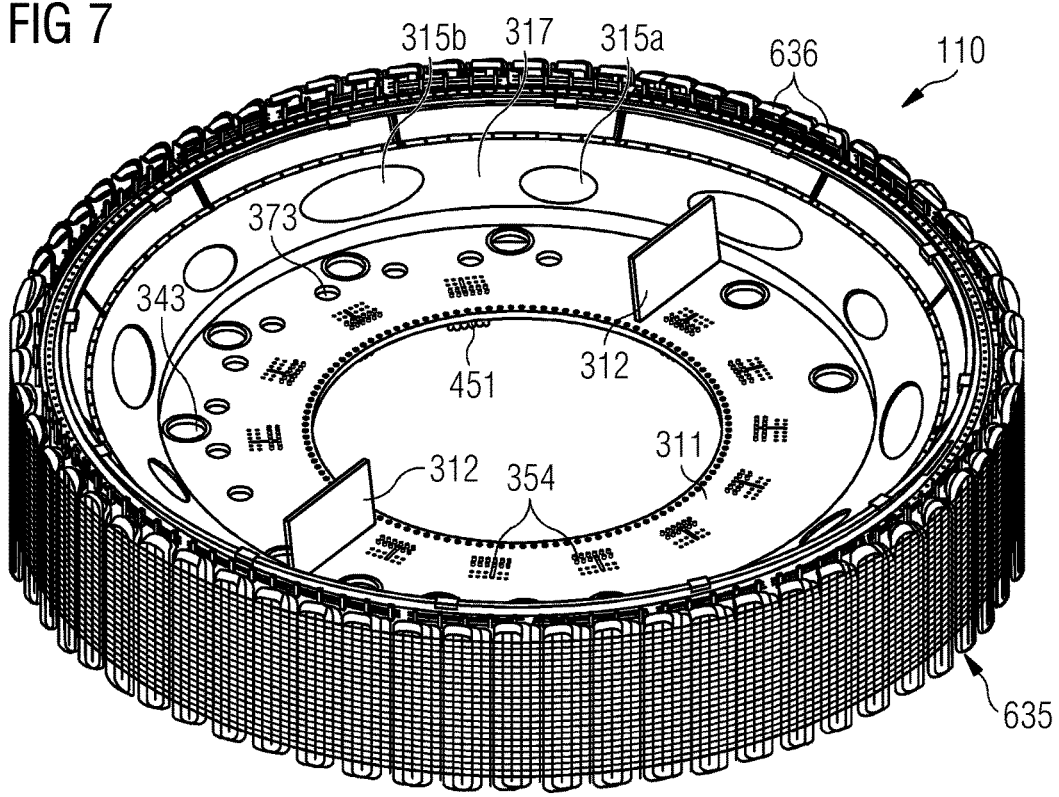
FIG. 7 shows the stator assembly with a plurality of stator segments.

FIG. 7 shows the stator assembly 110 with a plurality of stator segments 635. The entire circumference of the stator assembly 110 is covered with the stator segments 635. As a consequence, along the circumferential direction the coil windings 636 are arranged next to each other without any significant gap. This allows for an effective conversion of mechanical energy, which drives the rotor assembly 120 shown in FIG. 2, into electric energy generated from the time alternating magnetic flux which is picked up by the plurality of stator segments 636.

Figure 8:
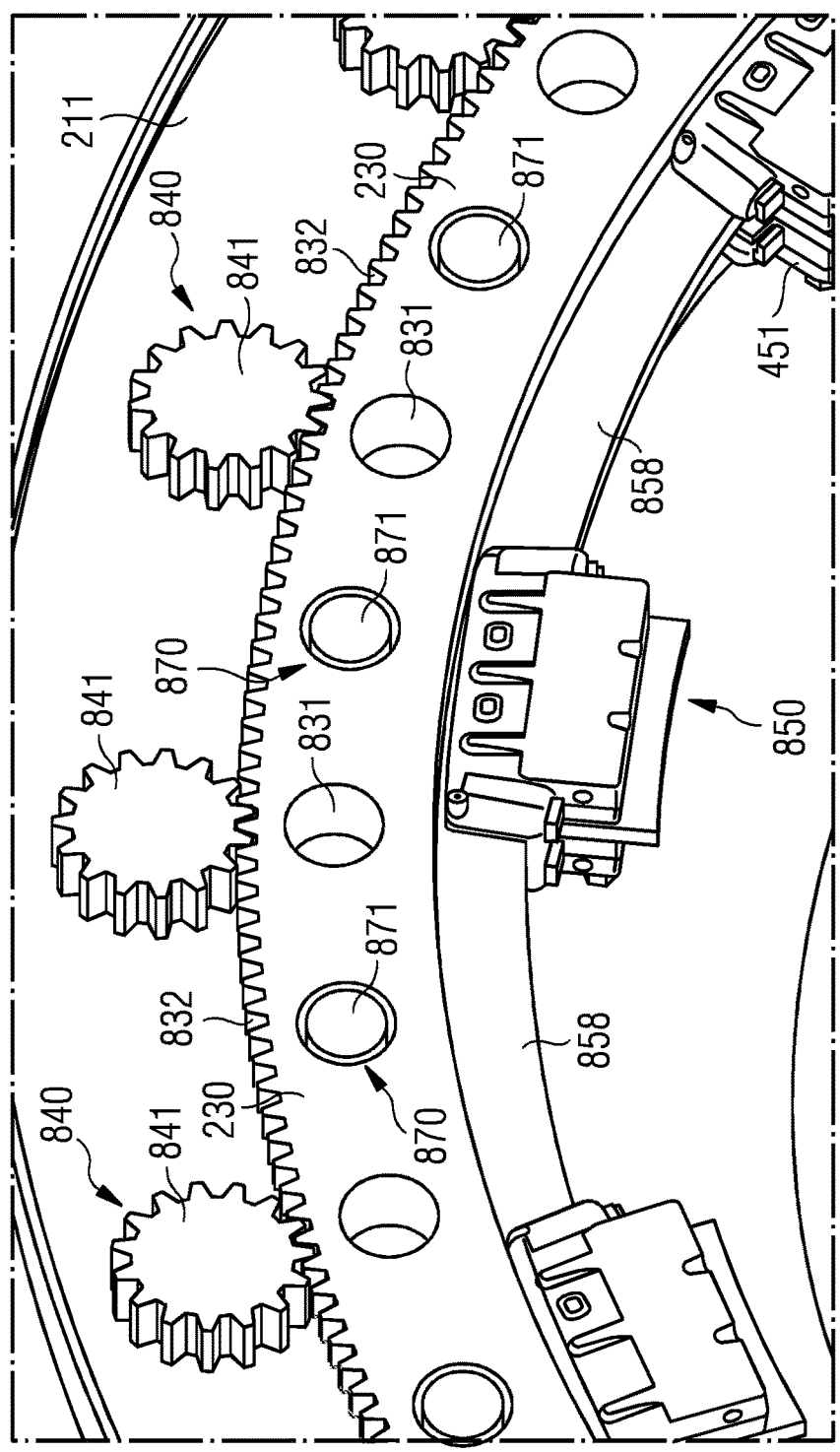
FIG. 8 shows in an enlarged view an annular device which is attached to the rotor assembly and which comprises (a) an engagement structure for driving a rotor assembly rotation and (b) a brake disc for stopping a rotor assembly rotation.

FIG. 8 shows in an enlarged view the annular device 230 which is attached to the rotor assembly 120. At its radially outer surface the annular device 230 comprises an engagement structure 832. According to the exemplary embodiment described here the engagement structure is realized by a toothed surface structure 832. At least when there is assembly and/or maintenance work to do, the engagement structure 832 engages with an engagement element 841 of a turning device 840 which is mounted to the base plate 221.

According to the exemplary embodiment described here along a circumferential direction there are provided several turning devices 840, wherein some turning devices 840 are installed in a fixed respectively non detachable manner at the base plate 221 and the remaining turning devices are installed in a detachable manner as described above.

In an active operational state of the turning devices 840 there is an engagement between the respective engagement element 841 and the engagement structure 832. In a passive operational state the respective engagement element 841 and the engagement structure 832 are mechanically decoupled from each other. A transition between (a) the passive operational state, which is given in a normal operation of the generator 100, and (b) the active operational state, which is given when a controlled rotation of the rotor assembly 120 is desired, is made by shifting the respective engagement element 841 along a rotational axis of the respective turning device 840.

In this respect it is mentioned that rather than having the turning devices 840 act directly on the teeth of the engagement structure 832, there is the option to place and mount the turning device(s) 840 a bit away from the annular device 230 and thus act indirectly on the engagement structure 832 through one or more intermediate toothed wheels. This may in particular be of advantage when the respective turning device 840 is used as a service turning device, as it could be mounted permanently at the (inner frame structure 311) of the entire stator frame structure even during a usual operation of the electric generator 100. When service is needed, the intermediate toothed wheel(s) can simply be placed in between the respective engagement element 841 in order to make the respective turning device 840 operably active. After service work has finished the intermediate toothed wheel(s) can be removed. Of course, also other mechanism for mechanically decoupling and coupling the engagement structure 832 to respectively from the engagement element 841 such as installable adapter devices are possible.

As can be further seen from FIG. 8, the generator 100 comprises several brake systems 850 which are also arranged along a perimeter surrounding the rotational axis 190a. Each brake system 850 comprises a brake caliper 451 which is mounted to the stator assembly 110. When activating the break system 850 the brake caliper 451 interacts with a (common) brake disk 858 being mounted to the rotor assembly 120. According to the exemplary embodiment described here the brake disk 858 is an inner portion of the annular device 230.

It is mentioned that in the embodiment described here the entirety of all the brake systems 850 is not being used as an emergency brake for stopping a rotation of the wind rotor 190 e.g. in case of emergency. The entirety of brake systems 850 is merely used as a so called service brake, which allows for further slowing down the rotor assembly 120 when being (already slowly) rotated for assembly and/or maintenance work.

As can be further seen from FIG. 8, the electric generator 100 further comprises a rotor lock system 870, which can be activated in order to prevent any unwanted rotation of the rotor assembly 120 and/or of the wind rotor 190. According to the exemplary embodiment described here there are provided several rotor lock systems 870 which are arranged at a perimeter around the rotational axis 190a and which are mounted to the stator assembly 110. Each rotor lock system 870 comprises an axially shiftable piston 871, which, when activating the respective rotor lock system 870, is pushed forward (perpendicular to the plane of drawing) in order to engage with respectively one engagement opening 831.

Figure 9:
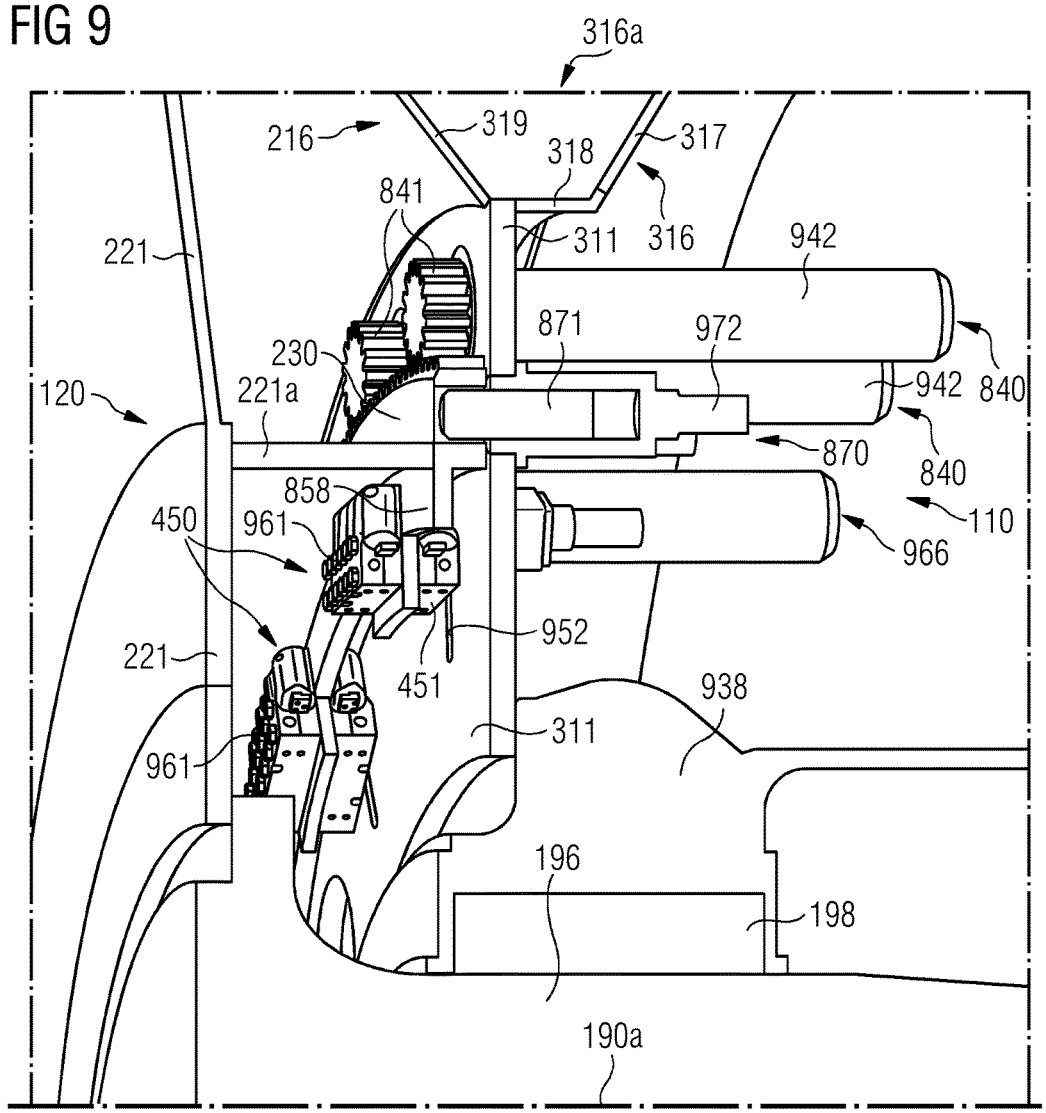
FIG. 9 shows a perspective half sectional view of the stator assembly and the rotor assembly.

FIG. 9 shows a perspective half sectional view of the stator assembly 110 and the rotor assembly 120. It can be seen how the rotor assembly 120 is connected to the shaft 196, whereas the shaft 196 is supported within a bearing 198 at the stator assembly 110. The bearing 198 is accommodated within a bearing support structure 938. The bearing support structure 938 is mechanically fixed to the inner frame structure 311 of the stator assembly 110.

In the enlarged view of FIG. 5 not the complete rotor assembly 120 but merely the base plate 221 as well as the flange 221a can be seen. The annular device 230 is firmly attached to the flange 221a.

At this point it is mentioned that the flange 221a not only has the purpose to arrange the annular device 230 along an axial direction close to the inner frame structure 211 of the stator assembly 110. The flange 221a may also contribute to a mechanical strengthening of the entire rotor assembly 120.

In FIG. 9 there can be clearly seen an actuator 942 of one of the turning devices 840 and a hydraulic motor 972 of one of the rotor lock systems 870. Both the actuator 942 and the hydraulic motor 972 are mounted to the inner frame structure 311 and extend along the axial direction (in FIG. 9 towards the right side).

According to the exemplary embodiment described here each brake caliper 451 is mounted to the inner frame structure 311 in a radially shiftable manner. In a first radial (outer) position of the brake caliper 451 a braking interaction between the brake caliper 451 and the brake disk 858 will be achieved when the brake caliper 451 is activated. In a second radial (inner) position of the brake caliper 451 the brake caliper 451 has shifted away from the brake disk 858 of the annular device 230. As a consequence, a braking interaction between the brake caliper 451 and the brake disk 858 is not possible. Descriptive speaking, when activating the brake caliper 451 its brake linings would "grab into the empty space".

According to the exemplary embodiment described here shifting the brake caliper 451 in between its first radial (outer) position and its second radial (inner) position is accomplished by a position system 966 which is also attached to the inner frame structure 311 of the stator assembly 110. In order to allow for a precise radial movement of the respective brake caliper 451 a guidance structure 952 is formed within the inner frame structure 311. As can be seen from FIG. 9, according to the exemplary embodiment described here, the guidance structure is realized by a slot 952 which extends in a radial direction. For temporarily fixing the brake caliper 451 in its radial (outer) position a first fixation means 961 is provided at the brake caliper 451. According to the exemplary embodiment described here the first fixation means or device is realized by a plurality of shiftable bolts 961.

Figure 10:
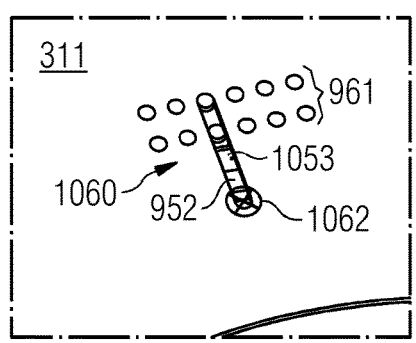
FIG. 10 shows a mechanism allowing for a radial shift of a brake caliper capable of interacting with the brake disc.

FIG. 10 shows a mechanism allowing for the above described radial shift of the (not shown) brake caliper 451 in more detail. A guidance element 1053 of the brake caliper 451 is guided within the slot 952. In order to prevent an unwanted rotation of the brake caliper 451 the guidance element 1053 is realized by an elongated stud.

It is mentioned that the guidance element may also be realized by two of the bolts 961, which two bolts run within the slot 952 and which may be non-shiftable bolts.

A fixation system 1060, which is schematically depicted in FIG. 10, ensures that the brake caliper 451 can be fixed either in the first radial (outer) position or in the second radial (inner) position. As has already been mentioned above, the first fixation means or device is realized by the shiftable bolts 961 which are attached to a housing of the brake caliper 451. Since in the first radial (outer) position a strong braking force may occur upon activation of the respective brake caliper 451 the first fixation means or device 961 must be mechanically very stable. In order to achieve such a stability and to prevent an unwanted rotation of the brake caliper 451 during a braking action, the shiftable bolts 961 are arranged in a two dimensional array. According to the exemplary embodiment described here this array comprises two rows of respectively six bolts. Of course, also other spatial arrangements of bolts are possible.

When activating the first fixation means or device 961 all but two shiftable bolts engage into a corresponding opening formed within the inner frame structure 311. The remaining two shiftable or non shiftable bolts engage within the slot 952. A second fixation means or device 1062 is used to fix the brake caliper 451 at its second radial (inner) position. Here, there are no braking forces which have to be absorbed. The second fixation means or device may be realized by a simple clamping device, which in FIG. 10 is schematically depicted and denominated with reference numeral 1062. In a particular simple configuration the second fixations means or device may comprises at least one nut which can be screwed onto bolts, in particular onto the two bolts running within the slot.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A stator assembly for an electric generator for use with a wind turbine, the stator assembly comprising:
   an inner frame structure having an annular shape with an inner circumferential edge and an outer circumferential edge, wherein the inner frame structure is formed around a center axis corresponding to an axial direction of the electric generator; and
   an outer frame structure, wherein the outer frame structure surrounds the inner frame structure and, starting from the outer circumferential edge of the inner frame structure, comprises two inclined annular walls, wherein the two inclined annular walls, along a radial direction, spread apart from each other such that in between a first inclined annular wall and the second inclined annular wall there is formed an accommodation space, wherein the first inclined annular wall forms a first radial outer edge of the outer frame structure and the second inclined annular wall forms a second radial outer edge of the outer frame structure, wherein the inner frame structure and the outer frame structure are made as a single piece.

2. The stator assembly as set forth in claim 1, wherein the outer frame structure further comprises an annular flange, wherein the annular flange, starting from the outer circumferential edge of the inner frame structure, extends along the axial direction and is arranged in between the outer circumferential edge of the inner frame structure and the first inclined annular wall.

3. The stator assembly as set forth in claim 1, wherein within at least one of the two inclined annular walls there is provided at least one opening allowing a human service technician to enter the accommodation space.

4. The stator assembly as set forth in claim 3, wherein within at least one of the two inclined annular walls there is provided at least one further opening, wherein the size of the further opening is larger than the size of the opening.

5. The stator assembly as set forth in claim 1, further comprising:
cooling installations accommodated within the accommodation space and are configured for cooling components of the stator assembly and/or components of a rotor assembly of the electric generator.

6. The stator assembly as set forth in claim 5, wherein the cooling installations comprise:
at least one ventilation device configured for driving a stream of a gaseous heat transfer medium through at least a part of the electric generator.

7. The stator assembly as set forth in claim 6, wherein the cooling installations further comprise:
at least one heat exchanger configured for transferring heat between the gaseous heat transfer medium and a liquid heat transfer medium.

8. The stator assembly as set forth in claim 7, wherein within at least one of the two inclined annular walls there is provided at least one aperture allowing the gaseous heat transfer medium driven by the ventilation device, to flow between the inside of the accommodation space and the outside of the accommodation space, to flow from the inside of the accommodation space to the outside of the accommodation space.

9. The stator assembly as set forth in claim 8, wherein both the first inclined annular wall and the second inclined annular wall are provided with at least one aperture and/or with at least one opening and/or with the at least one further opening.

10. The stator assembly as set forth in claim 1, further comprising:
a plurality of stator segments, each comprising at least one conductor coil, wherein during normal operation of the electric generator magnetic induction takes place, wherein the stator segments are mounted in between the first inclined annular wall and the second inclined annular wall.

11. The stator assembly as set forth in claim 1, further comprising:
at least one service platform,
said at least one service platform is attached to the inner frame structure and
extends in the axial direction.

12. The stator assembly as set forth in claim 1, further comprising:
at least one first mechanical interface formed at the inner frame structure and configured for receiving a turning device configured for engaging with a rotor assembly of the electric generator and
for turning the rotor assembly.

13. The stator assembly as set forth in claim 12, wherein the first mechanical interface is configured for receiving the turning device in a detachable manner.

14. The stator assembly as set forth in claim 1, further comprising:
at least one second mechanical interface formed at the inner frame structure and configured for receiving a brake caliper, said brake caliper is configured for engaging with a brake disk of the rotor assembly of the electric generator and
for stopping a rotational movement of the rotor assembly.

15. The stator assembly as set forth in claim 14, wherein the at least one second mechanical interface is configured for receiving the brake caliper in a radially shiftable manner, wherein
in a first radial position of the brake caliper a braking interaction between the brake caliper and the brake disk is possible and
in a second radial position of the brake caliper a braking interaction between the brake caliper and the brake disk is not possible.

16. The stator assembly as set forth in claim 15, wherein the second mechanical interface comprises a guidance structure having a radial extension and the brake caliper comprises a guidance element engaged with the guidance structure.

17. The stator assembly as set forth in claim 16, further comprising:
a fixation system for detachably fixing the brake caliper either in the first radial position or in the second radial position, wherein the fixation system comprises
first fixation device being associated with a fixation of the brake caliper in the first radial position and
second fixation device being associated with a fixation of the brake caliper in the second radial position.

18. The stator assembly as set forth in claim 17, wherein the first fixation device comprises a plurality of axially shiftable bolts, arranged in a one- or two-dimensional array, and/or
the second fixation device comprises a clamping device.

19. The stator assembly as set forth in claim 1, further comprising
at least one third mechanical interface formed at the inner frame structure and configured for receiving at least a part of a rotor lock system wherein
in a first axial position interlocks a rotational movement of the rotor assembly of the electric generator with respect to the stator assembly and
in a second axial position enables a rotational movement of the rotor assembly with respect to the stator assembly.

20. An electric generator, in particular an electric generator for a wind turbine, the electric generator comprising
a stator assembly as set forth in claim 1; and
a rotor assembly rotatably supported at the stator assembly for rotating around the center axis, wherein
the electric generator has an inner stator-outer rotor configuration.

21. The electric generator as set forth in claim 20, wherein the outer frame structure has an outer diameter larger than 7 m and/or
an air gap between the stator segments of the stator assembly and the magnets of the rotor assembly is smaller than 25 mm.

22. A wind turbine for generating electrical power, in particular an off-shore wind turbine, the wind turbine comprising
a tower;
a wind rotor arranged at a top portion of the tower and comprises at least one blade; and
an electric generator as set forth in claim 21, wherein the electric generator is mechanically coupled with the wind rotor.

23. A stator assembly for an electric generator for use with a wind turbine, the stator assembly comprising:
an inner frame structure comprising an annular ring with an inner circumferential edge and an outer circumferential edge and a flange on the outer circumferential edge, wherein the inner frame structure is formed around a center axis corresponding to an axial direction of the electric generator; and an outer frame structure, wherein the outer frame structure surrounds the inner frame structure and, starting from the outer circumferential edge, includes a first inclined annular wall and a second inclined annular wall, the first and second inclined annular walls, along a radial direction, spread apart from each other and forming a first radially outer edge of the outer frame structure and a second radially outer edge of the frame structure, respectively, such that in between the first inclined annular wall and the second inclined annular wall there is formed an accommodation space, wherein the accommodation space extends from the flange to the first and second radially outer edges of the outer frame structure, wherein within at least one of the first and second inclined annular walls there is provided at least one opening allowing a human service technician to enter the accommodation space, within at least one of the two inclined annular walls there is provided at least one further opening, the size of the further opening is larger than the size of the opening, wherein the inner frame structure and the outer frame structure are made as a single piece.

24. The stator assembly of claim 23, wherein the stator assembly includes at least one service platform attached to the inner frame, wherein the service platform is perpendicular to the annular ring.

25. The stator assembly of claim 23, further comprising:
a plurality of stator segments, each comprising at least one conductor coil, wherein the stator segments are mounted in the accommodation space.

* * * * *